United States Patent
Yu et al.

(10) Patent No.: US 12,141,393 B2
(45) Date of Patent: Nov. 12, 2024

(54) DISPLAY APPARATUS WITH TOUCH ELECTRODE EMBEDDED THEREIN

(71) Applicant: LG Display Co., Ltd., Seoul (KR)

(72) Inventors: ChungHo Yu, Paju-si (KR); KwangHan Lee, Paju-si (KR); JaeHoon Lim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/977,718

(22) Filed: Oct. 31, 2022

(65) Prior Publication Data

US 2023/0205360 A1   Jun. 29, 2023

(30) Foreign Application Priority Data

Dec. 28, 2021   (KR) .................. 10-2021-0189819

(51) Int. Cl.
    *G06F 3/041*   (2006.01)
(52) U.S. Cl.
    CPC ........ *G06F 3/04166* (2019.05); *G06F 3/0412* (2013.01); *G06F 3/04164* (2019.05)
(58) Field of Classification Search
    None
    See application file for complete search history.

(56) References Cited

U.S. PATENT DOCUMENTS

| 10,719,155 B2 | 7/2020 | Kim et al. |
| 2010/0194735 A1* | 8/2010 | Ohtsubo .............. G09G 3/3666 345/55 |
| 2012/0162121 A1 | 6/2012 | Chang et al. |
| 2014/0340381 A1* | 11/2014 | Kim .................... G09G 3/3677 345/212 |
| 2017/0060289 A1* | 3/2017 | Shin ...................... G09G 3/20 |
| 2019/0073074 A1 | 3/2019 | Kim et al. |
| 2020/0393926 A1* | 12/2020 | Kim ..................... G06F 3/0441 |

FOREIGN PATENT DOCUMENTS

| EP | 4020455 A1 | 6/2022 |
| KR | 10-2019-0027674 A | 3/2019 |
| KR | 10-2020-0046645 A | 5/2020 |

OTHER PUBLICATIONS

Intellectual Property Office of the United Kingdom, Office Action, GB Patent Application No. 2216433.9, Apr. 28, 2023, six pages.

\* cited by examiner

*Primary Examiner* — Krishna P Neupane
(74) *Attorney, Agent, or Firm* — Fenwick & West LLP

(57) ABSTRACT

A display apparatus with touch electrode embedded therein includes a display panel including gate lines and touch groups including touch electrodes, a generator generating a lower gate clock corresponding to a lower gate pulse output to a lower gate line included in a touch group and normal gate clocks supplied to normal gate lines except the lower gate line among gate lines corresponding to the touch group, a controller supplying gate control signals to the generator, and a gate driver generating gate pulses by using the gate control signals, the lower gate clock, and the normal gate clocks and supplying the gate pulses to gate lines corresponding to the touch group. A form of the lower gate clock differs from a form of each of the normal gate clocks, each of the touch groups is arranged in parallel with the gate lines, and the touch groups are arranged in a direction vertical to the gate lines.

25 Claims, 9 Drawing Sheets

DISPLAY APPARATUS WITH TOUCH ELECTRODE EMBEDDED THEREIN

CROSS-REFERENCE TO RELATED APPLICATION

This application claims the benefit of the Republic of Korea Patent Application No. 10-2021-0189819 filed on Dec. 28, 2021, which is hereby incorporated by reference in its entirety.

BACKGROUND

Field of Technology

The present disclosure relates to a display apparatus with touch electrode embedded therein.

Discussion of the Related Art

Display apparatuses include liquid crystal display (LCD) apparatuses and light emitting display apparatuses and each include a display panel which displays an image.

Touch electrodes may be embedded in the display panel, and the touch electrodes may be divided into at least two touch groups.

Display apparatuses may repeatedly perform a display period where an image is displayed and a touch sensing period, where a touch is sensed, during one frame period.

In this case, a phenomenon occurs where luminance of a horizontal line provided at a lowermost end of one touch group differs from that of a different region. Due to this, a problem occurs where a horizontal stripe appears in a lowermost end of each touch group.

SUMMARY

Accordingly, the present disclosure is directed to providing a display apparatus that substantially obviates one or more problems due to limitations and disadvantages of the related art.

An aspect of the present disclosure is directed to providing a display apparatus with touch electrode embedded therein, which changes a waveform of a lower gate clock, corresponding to a lower gate pulse output from a touch group among signals supplied to a gate driver, to differ from a waveform of a normal gate clock.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus comprising: a display panel including a plurality of gate lines and a plurality of touch groups including a plurality of touch electrodes; a generator circuit configured to generate a lower gate clock corresponding to a lower gate pulse that is output to a lower gate line among gate lines corresponding to a touch group from the plurality of touch groups, and generate normal gate clocks corresponding to normal gate pulses that are output to normal gate lines except the lower gate line among the gate lines corresponding to the touch group; a controller configured to supply gate control signals to the generator; and a gate driver configured to generate gate pulses including the lower gate pulse and the normal gate pulses using the gate control signals, the lower gate clock, and the normal gate clocks, and supply the gate pulses to the gate lines corresponding to the touch group, wherein a form of the lower gate clock is different from a form of each of the normal gate clocks, each of the plurality of touch groups is arranged in parallel with the plurality of gate lines, and the plurality of touch groups are arranged in a direction that is perpendicular to the plurality of gate lines.

In one embodiment, a display apparatus comprises: a display panel including a touch group having a plurality of touch electrodes, a plurality of gate lines that overlap the plurality of touch electrodes of the touch group, and a plurality of pixels that are connected to the plurality of gate lines, the plurality of gate lines including a first gate line and a second gate line that is located after the first gate line from amongst the plurality of gate lines; a gate driver configured to output a plurality of gate signals that are supplied to the plurality of gate lines, the plurality of gate signals including a first gate signal output to the first gate line and a second gate signal output to the second gate line, wherein the first gate signal output to the first gate line includes a first gate pulse having a form that is different from a form of a second gate pulse included in the second gate signal that is output to the second gate line located after the first gate line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
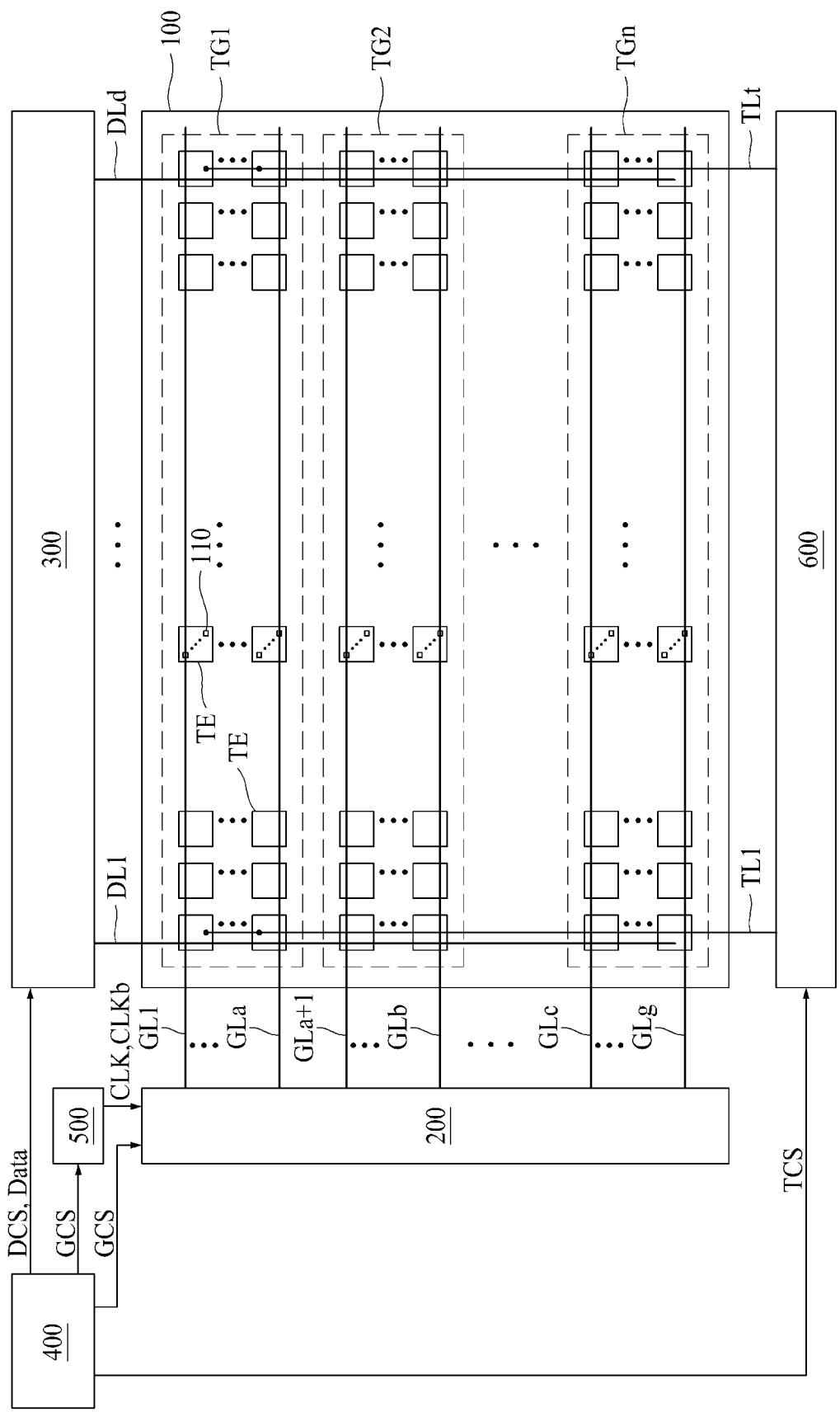
FIG. 1 is an exemplary diagram illustrating a configuration of a display apparatus with a touch electrode embedded therein according to one embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
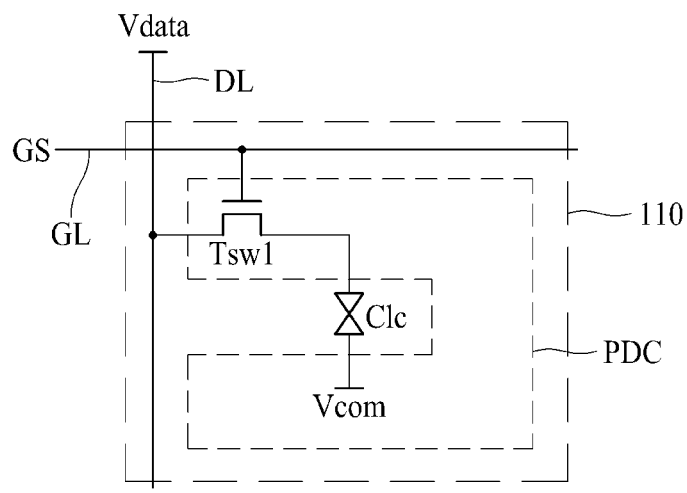
FIGS. 2 and 3 are exemplary diagrams illustrating a structure of a pixel applied to a display apparatus with a touch electrode embedded therein according to one embodiment of the present disclosure.
Figure 3:
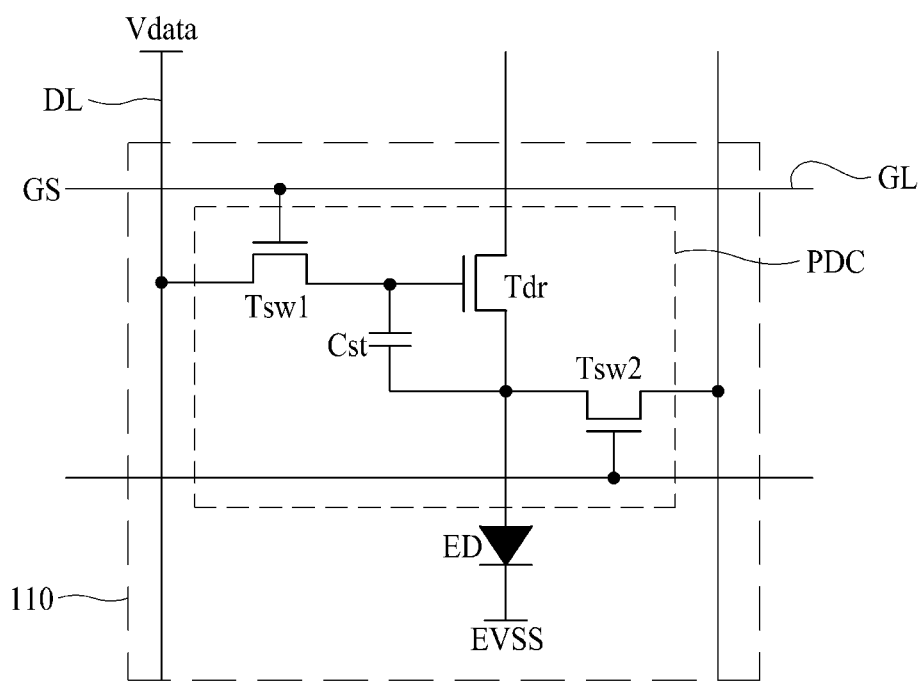
Figure 4:
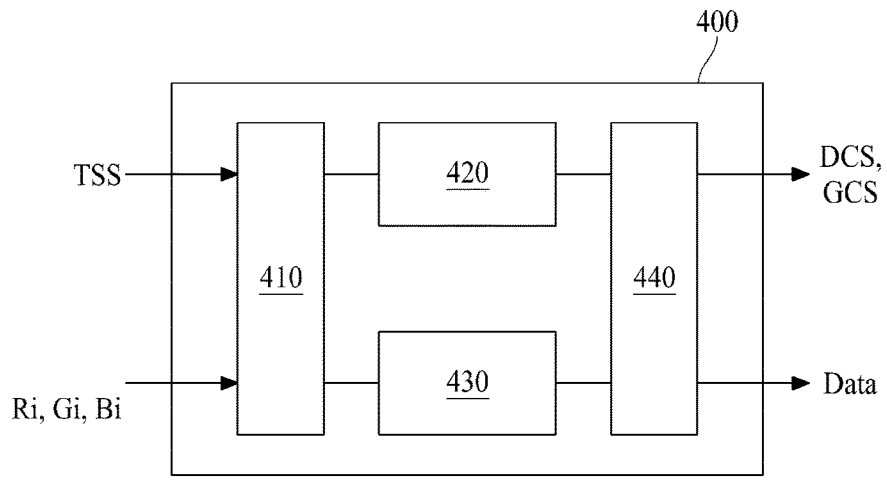
FIG. 4 is an exemplary diagram illustrating a structure of a controller applied to a display apparatus with a touch electrode embedded therein according to one embodiment of the present disclosure.
Figure 5:
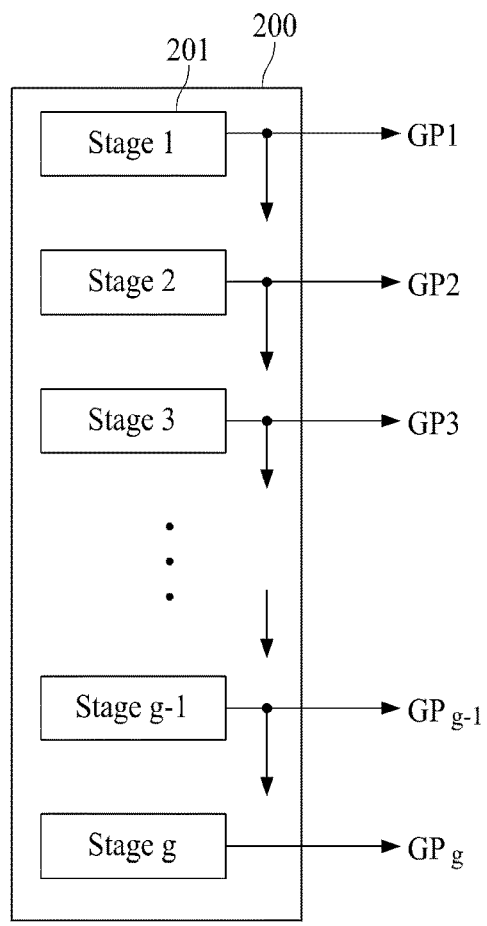
FIG. 5 is an exemplary diagram illustrating a structure of a gate driver applied to a display apparatus with a touch electrode embedded therein according to one embodiment of the present disclosure.
Figure 6:
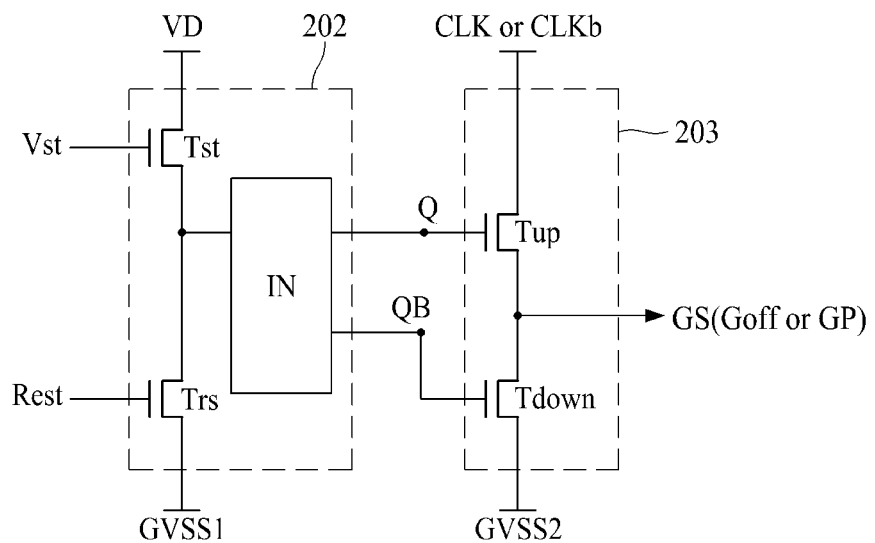
FIG. 6 is an exemplary diagram schematically illustrating a structure of a stage illustrated in FIG. 5 according to one embodiment of the present disclosure.

FIG. 1 is an exemplary diagram illustrating a configuration of a display apparatus with a touch electrode embedded therein according to one embodiment of the present disclosure. FIGS. 2 and 3 are exemplary diagrams illustrating a structure of a pixel applied to a display apparatus with a touch electrode embedded therein according to one embodiment of the present disclosure. FIG. 4 is an exemplary diagram illustrating a structure of a controller applied to a display apparatus with a touch electrode embedded therein according to one embodiment of the present disclosure. FIG. 5 is an exemplary diagram illustrating a structure of a gate driver applied to a display apparatus with a touch electrode embedded therein according to one embodiment of the present disclosure. FIG. 6 is an exemplary diagram schematically illustrating a structure of a stage illustrated in FIG. 5 according to one embodiment of the present disclosure.

The display apparatus with touch electrode embedded therein (hereinafter simply referred to as a display apparatus) according to the present disclosure may configure various electronic devices. The electronic devices may include, for example, smartphones, tablet personal computers (PCs), televisions (TVs), and monitors.

The display apparatus with touch electrode embedded therein according to the present disclosure, as illustrated in FIG. 1, may include a display panel 100, a gate driver 200, a data driver 300, a controller 400, a generator 500, and a touch driver 600.

First, the display panel 100 may be divided into a display area which displays an image and a non-display area which surrounds an outer portion of the display area.

The display panel 100 may include gate lines GL1 to GLg, data lines DL1 to DLd, and pixels 110. Each of the pixels 110 may be connected to a gate line and a data line. The gate lines GL1 to GLg may be connected to a gate driver 200, and the data lines DL1 to DLd may be connected to a data driver. Here, g and d may each be a natural number.

The display panel 100 may include touch electrodes TE, and the touch electrodes TE may be divided into at least two touch groups TG1 to TGn (where n is a natural number of 1 or more). That is, each of the touch groups may include a plurality of touch electrodes TE.

Each of the touch groups TG may be provided in parallel with the gate lines GL1 to GLg, and the touch groups TG may be provided in a direction vertical to the gate lines GL1 to GLg.

Each of the touch electrodes TE may be connected to the touch driver 600 through a touch line TL.

One touch electrode TE may overlap at least two gate lines GL and at least two data lines DL. Accordingly, one touch electrode TE may overlap at least two pixels.

Therefore, each of the touch groups TG1 to TGn may overlap at least two gate lines.

The touch electrodes TE may be embedded in the display panel 100. In this case, the touch electrode TE may overlap at least two pixels, and a voltage applied to at least two pixels in common may be supplied to the touch electrode TE.

When the display panel is a liquid crystal display panel including the pixel 110 as illustrated in FIG. 2, the touch electrode TE may be a common electrode. When the display panel is a light emitting display panel including the pixel 110 as illustrated in FIG. 3, the touch electrode TE may be a cathode electrode.

That is, the display panel 100 may be a liquid crystal display panel which displays an image by using liquid crystal, or may be a light emitting display panel configured with a light emitting device ED.

For example, when the display panel 100 is a liquid crystal display panel, as illustrated in FIG. 2, the pixel 110 included in the display panel 100 may include a pixel driving circuit PDC including a switching transistor Tsw1 and a common electrode and an emission area including liquid crystal. In FIG. 2, reference numeral Clc may denote liquid crystal provided between the common electrode and a pixel electrode connected to the switching transistor Tsw1. In the liquid crystal display panel, as described above, the touch electrode TE may be the common electrode. In this case, a common voltage Vcom may be supplied to the touch electrode TE in a display period, and a touch driving signal may be supplied to the touch electrode TE in a touch sensing period. When the display panel 100 is a liquid crystal display panel, the display apparatus may further include a backlight which irradiates light onto the liquid crystal display panel.

For example, when the display panel 100 is a light emitting display panel, as illustrated in FIG. 3, the pixel 110 included in the display panel 100 may include a pixel driving circuit PDC, including a switching transistor Tsw1, a storage capacitor Cst, a driving transistor Tdr, and a sensing transistor Tsw2, and an emission area including a light emitting device ED. In the light emitting display panel, as described above, the touch electrode TE may be a cathode electrode. The cathode electrode may be an electrode connected to the light emitting device ED. In this case, a cathode electrode EVSS may be supplied to the cathode electrode in the display period, and the touch driving signal may be supplied to the cathode electrode in the touch sensing period. The pixel 110 applied to the light emitting display panel may be implemented in various structures in addition to a structure illustrated in FIG. 3.

Hereinafter, for convenience of description, a display apparatus where a display panel is a liquid crystal display panel will be described as an example of the present disclosure.

The data driver 300 may be mounted on a chip on film attached on the display panel 100. In this case, the data driver 300 may be connected to the data lines DL1 to DLd included in the display panel 100 and the controller 400 mounted on a main substrate.

The data driver 300 may be directly mounted on the display panel 100, and then, may be connected to the controller 400 provided in the main substrate.

The data driver 300 may be implemented as one integrated circuit (IC) along with the controller 400. In this case, the IC may be mounted on a chip on film, or may be directly equipped in the display panel 100.

The generator 500 (e.g., a circuit) may generate a lower gate clock corresponding to a lower gate pulse output to lower gate lines GLa or GLb or GLg (where a is a natural number of 1 or more, b is a natural number which is more than a, and g is a natural number which is more than b) provided at a lower end of the touch group TG and normal gate clocks corresponding to normal gate pulses supplied to normal gate lines except a lower gate line among gate lines corresponding to a touch group. That is, the generator 500 generates a lower gate clock (e.g., a first gate clock) corresponding to a lower gate pulse (e.g., a first gate pulse) that is output to the last gate lines in each touch group and generates normal gate clocks (e.g., second gate clock) corresponding to normal gate pules (e.g., second gate pulse) that are output to all remaining gate lines in the touch group. In one embodiment, the last gate in each touch group is the gate line that is closest to the touch driver 600 amongst the gate lines in the touch group.

In the present disclosure, a form of the lower gate clock may differ from that of each of the normal gate clocks. That is, the lower gate clock is different from the normal gate clock. A form of the lower gate pulse may be similar to that of the lower gate clock, and a form of the normal gate pulse may be similar to that of the normal gate clock.

The generator 500 may generate control clocks used to generate the lower gate clock, based on gate control signals transferred from the controller 400.

The lower gate line (for example, GLa) may be provided between a touch group (for example, the first touch group TG1) corresponding to the lower gate line and another touch group (for example, the second touch group TG2) adjacent to the touch group.

Hereinafter, a detailed structure and function of the generator 500 will be described in detail with reference to FIGS. 6 to 13.

The controller 400 may realign input video data Ri, Gi, and Bi transferred from an external system by using a timing synchronization signal TSS transferred from the external system and may generate gate control signals GCS which are to be supplied to the generator 500 and the gate driver 200.

To this end, as illustrated in FIG. 4, the controller 400 may include a data aligner 430 which realigns the input video data Ri, Gi, and Bi to generate image data Data and supplies the image data Data to the data driver 300, a control signal generator 420 which generates the gate control signal GCS and a data control signal DCS by using the timing synchronization signal TSS, an input unit 410 which receives the timing synchronization signal TSS and the input video data Ri, Gi, and Bi transferred from the external system and respectively transfers the timing synchronization signal and the input video data to the data aligner and the control signal generator, and an output unit 440 which supplies the data driver 300 with the image data Data generated by the data aligner and the data control signal DCS generated by the control signal generator and supplies the generator 500 and the gate driver 200 with the gate control signals GCS generated by the control signal generator.

The gate control signals GCS supplied to the generator 500 may be the same as or different from the gate control signals GCS supplied to the gate driver 200

The controller 400 may analyze sensing signals transferred from the touch driver 600 to sense the occurrence of touch and a corresponding touch position or a lack of touch, and may transfer information about the sensed touch position to the external system. The controller 400 may transfer information about a touch position, transferred from the touch driver 600 or another element, to the external system.

The external system may perform a function of driving the controller 400 and an electronic device. For example, when the electronic device is a TV, the external system may receive various sound information, video information, and letter information over a communication network and may transfer the received video information to the controller 400. In this case, the image information may include input video data Ri, Gi, and Bi.

The touch driver 600 may supply a common voltage to the touch electrode TE in the display period. The touch driver 600 may supply the touch driving signal to the touch electrodes TE in the touch sensing period and may receive touch sensing signals transferred from the touch electrodes TE.

The display period and the touch sensing period may be repeated a plurality of times during one frame period.

For example, an image may be displayed on a first region corresponding to a first touch group TG1 of the touch groups TG1 to TGn illustrated in FIG. 1 during the display period, and then, a touch applied to the first region may be sensed during the touch sensing period by using touch electrodes included in the first region.

After a touch is sensed in the first region, an image may be displayed on a second region corresponding to another touch group (a second tough group TG2) adjacent to the first touch group TG1 during the display period, and after an image is displayed on the second region, a touch applied to the second region may be sensed during the touch sensing period by using touch electrodes included in the second region.

Here, one frame period may denote a period where one image is displayed by the display panel as all of the gate lines GL1 to GLg included in the display panel are driven.

The touch driver 600 may convert touch sensing signals, received from the touch electrodes TE, into digital sensing signals and may transfer the sensing signals to the controller 400 or another element. The touch driver 600 may analyze the touch sensing signals to sense the occurrence or not of a touch and a touch position and may transfer information about the sensed touch position to the controller 400.

The touch driver 600 may be driven by a touch control signal TCS transferred from the controller 400.

Finally, the gate driver 200 may be configured as an IC and mounted in a non-display area. Also, the gate driver 200 may be directly embedded in the non-display area by using a gate in panel (GIP) type. In a case which uses the GIP type, transistors configuring the gate driver 200 may be provided in the non-display area through the same process as transistors included in each of the pixels 110 of a display area.

When the gate pulse generated by the gate driver 200 is supplied to a gate of the switching transistor Tsw1 included in the pixel 110, the switching transistor Tsw1 may be turned on. When the switching transistor Tsw1 is turned on, a data voltage supplied through a data line may be supplied to the pixel 110. When a gate off signal is supplied to the switching transistor Tsw1, the switching transistor Tsw1 may be turned off. When the switching transistor Tsw1 is turned off, the data voltage may not be supplied to the pixel 110. The gate signal GS supplied to the gate line GL may include the gate pulse and the gate off signal.

Particularly, the gate driver 200 may generate gate pulses by using the gate control signals GCS, a lower gate clock CLKb, and normal gate clocks CLK and may supply the gate pulses to gate lines corresponding to the touch group.

To this end, as illustrated in FIG. 5, the gate driver 200 may include a plurality of stages 201 which supply gate pulses GP1 to GPg to the gate lines GL1 to GLg connected to the pixels 101.

Each of the stages 201 may include a plurality of transistors, and the gate control signals GCS, the lower gate clock, the normal gate clocks, and voltages having various levels may be supplied to the stages 201. The stages 201 may generate the gate pulses GP1 to GPg by using various kinds of signals and voltages and may sequentially supply the gate pulses GP1 to GPg to the gate lines GL1 to GLg.

To this end, as illustrated in FIG. 6, each of the stages 201 may include a node signal generator 202, which generates a Q node signal supplied to a Q node Q and a QB node signal having a phase opposite to a phase of the Q node signal so that the gate pulse GP is output, and a gate signal output unit 203 which outputs the gate pulse GP based on the Q node signal supplied to the Q node and outputs a gate off signal Goff based on the QB node signal supplied to the QB node. The gate signal GS may include the gate pulse GP and the gate off signal Goff.

First, the node signal generator 202 may include a plurality of transistors that are configured to generate the Q node signal and the QB node signal. In FIG. 6, in order to describe a basic structure and a basic function of the node signal generator 202 applied to the present disclosure, the node signal generator 202 including two transistors Tst and Trs and an inverter IN is illustrated. That is, the node signal generator 202 illustrated in FIG. 6 is illustrated as an example of the node signal generator applied to the present disclosure and is schematically illustrated.

The start transistor Tst may be turned on by a start signal Vst and may supply a high voltage VD to a gate signal output unit 203 through the Q node Q. Here, the start signal Vst may be a gate start signal transferred from the controller 400, or may be the gate pulse GP transferred from a previous stage. Based on the high voltage VD transferred to the Q node, a pull-up transistor Tup of the gate signal output unit 203 may be turned on, and thus, the gate pulse GP may be output through the pull-up transistor Tup.

The high voltage VD passing through the start transistor Tst may be changed to a low voltage by the inverter IN and may be transferred to the QB node QB. However, the inverter IN may change a voltage, differing from the high voltage VD, to a low voltage and may transfer the low voltage to the QB node QB, or may transfer a low voltage, applied from the outside, to the QB node QB. Based on the low voltage transferred to the QB node QB, a pull-down transistor Tdown of the gate signal output unit 203 may be turned off, and thus, only the gate pulse GP may be output to a gate line GL through the pull-up transistor Tup.

When the start transistor Tst is turned off and the reset transistor Tsr is turned on by a reset signal Rest, a first low voltage GVSS1 may be supplied to the Q node Q through the reset transistor Trs. Accordingly, the pull-up transistor Tup may be turned off, and thus, the gate pulse GP may not be output.

The first low voltage GVSS1 may be changed to a high voltage by the inverter IN and may be supplied to the QB node QB. The pull-down transistor Tdown of the gate signal output unit 203 may be turned on by the high voltage transferred to the QB node QB, and thus, the gate off signal Goff may be output to a gate line GL through the pull-down transistor Tdown.

To provide an additional description, the inverter IN may supply the high voltage VD or the first low voltage GVSS1 to the Q node Q, change the high voltage VD or the first low voltage GVSS1 to a low voltage or a high voltage, and supply the low voltage or the high voltage to the QB node QB.

To this end, the inverter IN may be implemented in various structures, and the node signal generator 202 including the inverter IN may also be implemented in various structures.

That is, the node signal generator 202 may generate the Q node signal supplied to the Q node Q and the QB node signal having a phase opposite to a phase of the Q node signal so that the gate pulse GP is output, and to this end, may be implemented in various structures.

In this case, various kinds of gate control signals (for example, a gate start signal) may be supplied from the controller 400 to the node signal generator 202.

Second, the gate signal output unit 203 may output the gate pulse GP or the gate off signal Goff to the gate line GL.

To this end, as illustrated in FIG. 6, the gate signal output unit 203 may include the pull-up transistor Tup which outputs the gate pulse GP based on the Q node signal transferred from the Q node Q and the pull-down transistor Tdown which outputs the gate off signal Goff based on the QB node signal transferred from the QB node QB.

When the pull-up transistor Tup is turned on by the Q node signal, the normal gate clock CLK or the lower gate clock CLKb supplied to a first terminal of the pull-up transistor Tup may be output to the gate line GL through a second terminal of the pull-up transistor Tup.

A signal output to the gate line GL through the second terminal of the pull-up transistor Tup may be referred to as a normal gate pulse or a lower gate pulse. That is, a signal generated from the normal gate clock CLK may be referred to as a normal gate pulse, and a signal generated from the lower gate clock CLKb may be referred to as a lower gate pulse. The normal gate pulse may be supplied to the normal gate line, and the lower gate clock CLKb may be supplied to the lower gate line.

The lower gate line may denote a gate line provided at the lower end of the touch group TG, and the normal gate line may denote a gate line except the lower gate line among the gate lines.

In the following description, when it is not required to differentiate the normal gate line from the lower gate line, a generic name for the normal gate line and the lower gate line may be a gate line.

Moreover, when it is not required to differentiate the normal gate pulse from the lower gate pulse, a generic name for the normal gate pulse and the lower gate pulse may be a gate pulse.

Moreover, when it is not required to differentiate the normal gate clock CLK from the lower gate clock CLKb, a generic name for the normal gate clock CLK and the lower gate clock CLKb may be a gate clock.

When the pull-up transistor Tup is turned off based on the Q node signal, the gate pulse may not be output to the gate line.

When the pull-down transistor Tdown is turned on based on the QB node signal, a second low voltage GVSS2 supplied to a first terminal of the pull-down transistor Tdown may be output to the gate line GL through a second terminal of the pull-down transistor Tdown. A signal output to the gate line GL through the second terminal of the pull-down transistor Tdown may be referred to as a gate off signal Goff.

When the pull-down transistor Tdown is turned off based on the QB node signal, the gate off signal may not be output to the gate line.

Hereinafter, the introduction background of the present disclosure will be simply described with reference to FIGS. 7A and 7B.

Figure 7A:
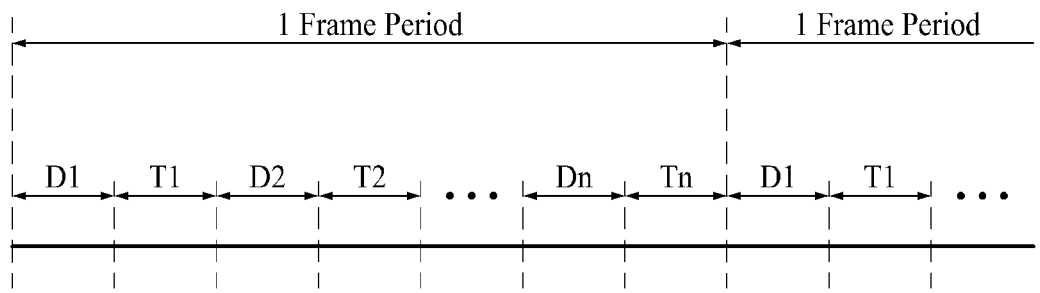
FIG. 7A is an exemplary diagram illustrating a method of repeating a display period and a touch sensing period in a display apparatus with a touch electrode embedded therein according to one embodiment of the present disclosure.
Figure 7B:
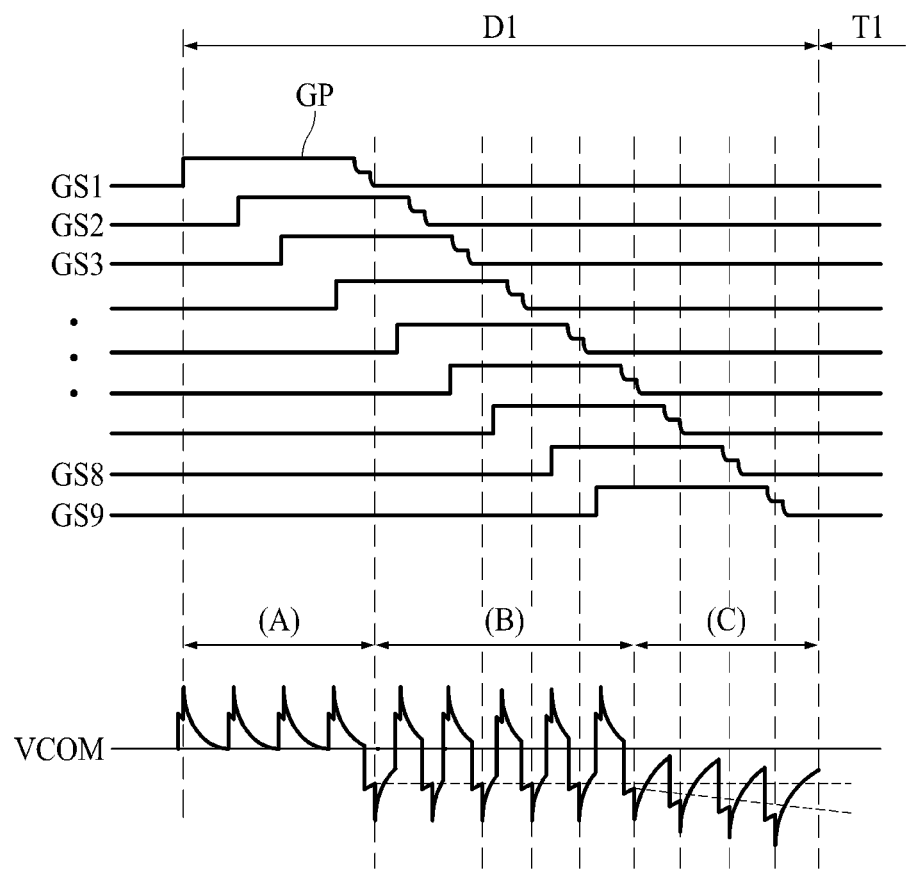
FIG. 7B is an exemplary diagram illustrating a variation of a common voltage applied to a touch electrode when the display apparatus is driven based on the method of FIG. 7A according to one embodiment of the present disclosure.

FIG. 7A is an exemplary diagram illustrating a method of repeating a display period and a touch sensing period in a display apparatus with touch electrode embedded therein according to one embodiment, and FIG. 7B is an exemplary diagram illustrating a variation of a common voltage applied to a touch electrode when the display apparatus is driven based on the method of FIG. 7A according to one embodiment.

In the display apparatus with touch electrode embedded therein, as illustrated in FIG. 7A, a display period D where an image is displayed and a touch sensing period T where a touch is sensed may be repeated a plurality of times during one frame period (1 Frame Period). Here, one frame period may denote a period where the display panel displays one image as all of the gate lines GL1 to GLg included in the display panel are driven.

For example, as illustrated in FIG. 1, when n number of touch groups TG1 to TGn are included in the display panel 100, an image may be displayed on a first region corresponding to a first touch group TG1 during a first display period D1, and then, a touch may be sensed through touch electrodes TE included in the first region during a first touch sensing period T1.

Subsequently, an image may be displayed on a second region corresponding to a second touch group TG2 during a second display period D2, and then, a touch may be sensed through touch electrodes TE included in the second region during a second touch sensing period T2.

After such an operation may be repeated up to the n−1$^{th}$ touch group, an image may be displayed on an n$^{th}$ region corresponding to an n$^{th}$ touch group TGn during an n$^{th}$ display period Dn, and then, a touch may be sensed through touch electrodes TE included in the n$^{th}$ region during an n$^{th}$ touch sensing period Tn.

Such operations may be performed during one frame period, and thus, one image may be displayed by the display panel 100. Subsequently, the operations may be repeatedly performed during one other frame period.

In this case, when nine gate lines are included in each of the touch groups TG1 to TGn illustrated in FIG. 1, first to ninth gate pulses GP may be sequentially output to first to ninth gate lines during the first display period D1 as illustrated in FIG. 7B. During the first display period D1, the common voltage may be supplied to the touch electrodes TE configuring the first touch group TG1.

In this case, as illustrated in FIG. 7B, the common voltage (hereinafter simply referred to as a real common voltage VCOMd) substantially applied to the touch electrodes TE of the first touch group TG1 may decrease progressively in a direction from a start time of the first display period D1 to an end time thereof.

The reason that a level of the real common voltage VCOMd decreases, as illustrated in FIG. 7B, is because only rising gate pulses GP are in a start portion A of the first display period D1, rising gate pulses and falling gate pulses are in a middle portion B of the first display period D1, and falling gate pulses are in an end portion C of the first display period D1 without any rising gate pulses GP.

To provide an additional description, the real common voltage VCOMd may rise based on rising gate pulses in the start portion A, the real common voltage VCOMd may rise and fall based on rising gate pulses and falling gate pulses in the middle portion B, and the real common voltage VCOMd may fall based on falling gate pulses in the end portion C. That is, a level of the real common voltage VCOMd applied to the touch electrode TE may be affected by levels of forms of gate pulses. In other words, the magnitude of the real common voltage VCOMd is impacted by the rising and falling gate pulses GP.

Therefore, the real common voltage VCOMd of the end portion C may be less than the real common voltage VCOMd of start portion A.

Because the real common voltage VCOMd applied to a touch electrode when an image is displayed in the end portion C of the first display period D1 is less than the real common voltage VCOMd applied to the touch electrode when an image is displayed in the start portion A of the first display period D1, the real luminance of an image displayed in the end portion C of the first display period D1 may be less than basic luminance which is expected in an ideal state. Here, the ideal state may denote a state where the real common voltage VCOMd does not vary in the start portion A, the middle portion B, and the end portion C.

Such a luminance reduction phenomenon may occur in the end portion C of the first display period D1, and particularly, may severely occur in a gate line provided at a lower end of the first touch group TG1. That is, in the end portion C of the first display period D1, because a gate pulse is output from the gate line provided at the lower end of the first touch group TG1, a luminance reduction phenomenon may severely occur in the gate line provided at the lower end of the first touch group TG1.

In the embodiment, a ninth gate line to which a ninth gate signal GS is supplied may be provided at the lower end of the first touch group TG1. The ninth gate line may be adjacent to the second touch group TG2, and particularly, may be adjacent to a tenth gate line provided at an uppermost end of the second touch group TG2.

A gate line provided at a lower end of the touch group TG like the ninth gate line may be referred to as a lower gate line, and all remaining gate lines except the lower gate line in the touch group TG may be referred to as normal gate lines.

Therefore, in the display panel 100 illustrated in FIG. 1, an $a^{th}$ gate line GLa, a $b^{th}$ gate line GLb, and a $g^{th}$ gate line GLg may be a lower gate line, and the other gate lines may be normal gate lines.

That is, in each of touch groups, the real luminance of an image displayed in the lower gate line may be less than a basic luminance (e.g., a minimum required luminance).

Accordingly, a horizontal stripe having luminance which is less than that of the other region may be shown in a lower end of each touch group. Due to the horizontal stripe, a display apparatus may be determined to be defective, or the image quality of a display apparatus may be reduced.

Hereinabove, the lower gate line is described as a single gate line provided in a lower end of a touch group, but the lower gate line may be two or more gate lines provided in the lower end of the touch group.

For example, in an embodiment described above with reference to FIG. 7B, only a ninth gate line to which a ninth gate signal GS9 is supplied may be a lower gate line, or an eighth gate line to which an eighth gate signal GS8 is supplied and the ninth gate line to which the ninth gate signal GS9 is supplied may be a lower gate line.

That is, a lower gate line may denote a gate line where a horizontal stripe defect described above occurs, and the number of lower gate lines may be variously set based on a width of a gate pulse and the occurrence or not of the horizontal stripe defect.

Hereinafter, for convenience of description, a display apparatus where only one lower gate line is in each of the touch groups TG1 to TGn will be described as an example of the present disclosure.

The present disclosure may be for preventing the occurrence of a horizontal stripe defect described above.

The horizontal stripe defect, as described above, may occur because a real common voltage VCOMd of when a gate pulse is supplied to the lower gate line of the touch group TG is less than a real common voltage VCOMd of when gate pulses are supplied to normal gate lines provided in the upper end of the touch group TG.

In order to compensate for such a difference, the present disclosure may use a method where a period where a data voltage is supplied to a pixel increases so that the data voltage is sufficiently charged into the pixel, or a lower falling level of a lower gate clock is set to be higher than a falling level of a normal gate clock.

The present disclosure using a method of increasing a period where a data voltage is supplied to a pixel will be described below with reference to FIGS. 8 and 9, and the present disclosure using a method, where a lower falling level of a lower gate clock is set to be higher than a falling level of a normal gate clock, will be described below with reference to FIGS. 10 to 13.

Figure 8:
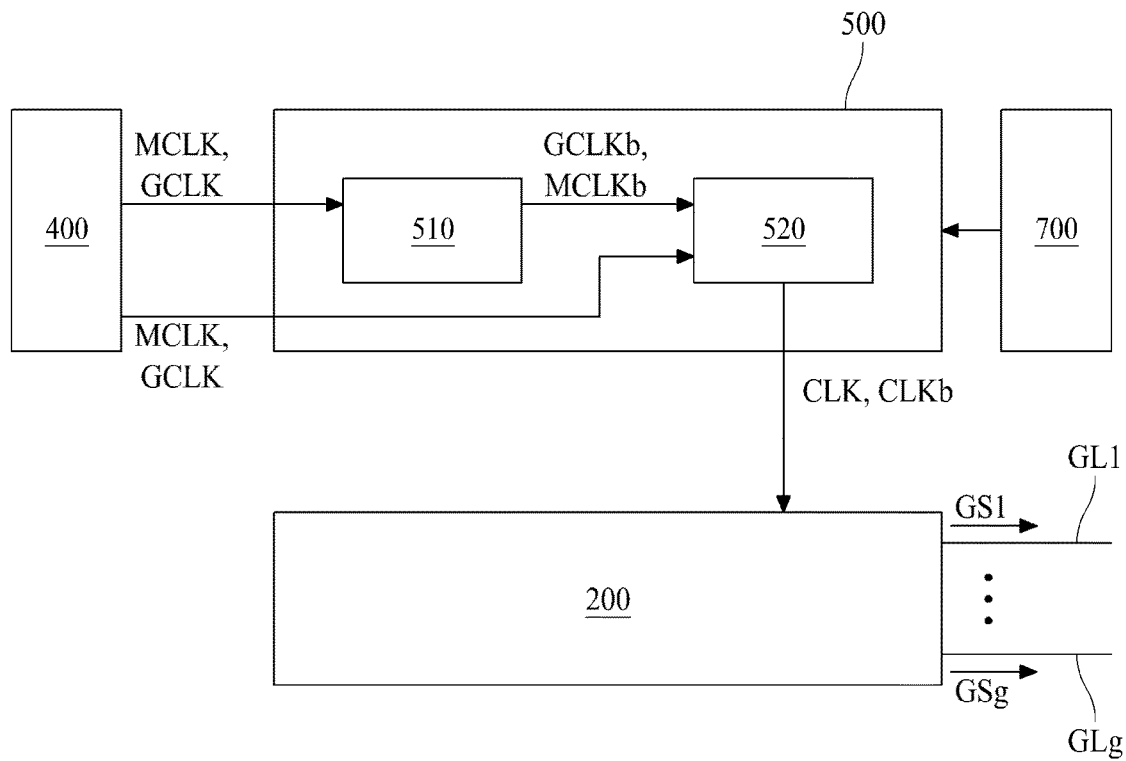
FIG. 8 is an exemplary diagram illustrating an internal configuration of a generator applied to a display apparatus with a touch electrode embedded therein according to one embodiment of the present disclosure.
Figure 9:
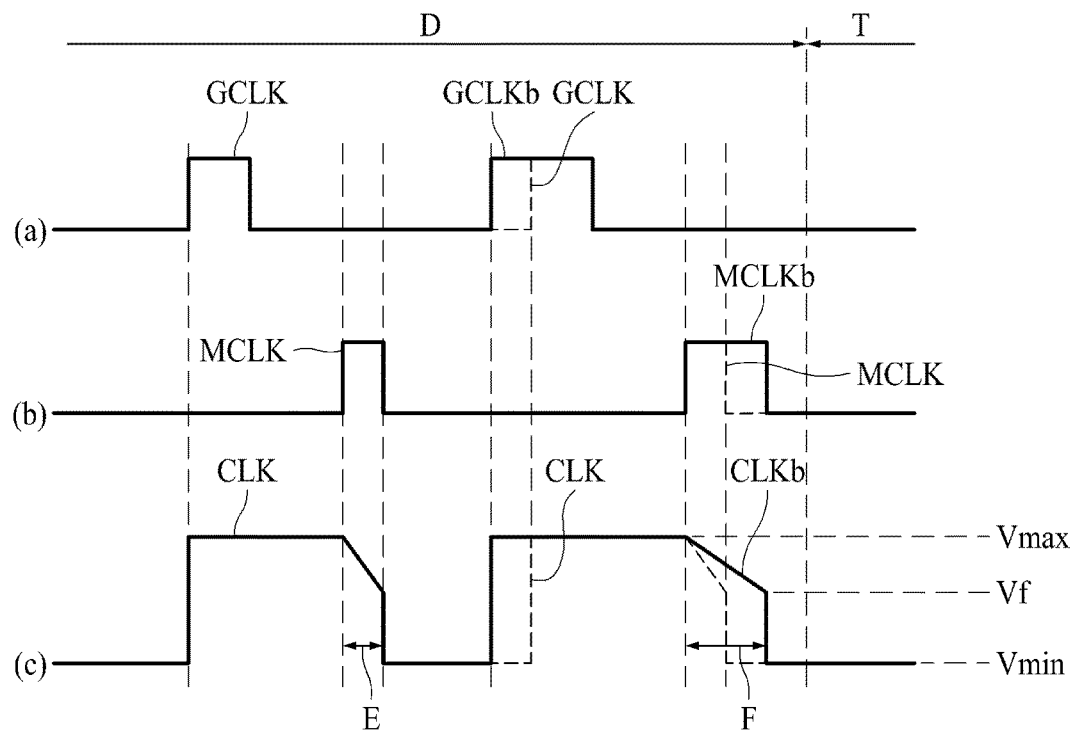
FIG. 9 is an exemplary diagram illustrating a lower gate clock generated by the generator illustrated in FIG. 8 according to one embodiment of the present disclosure.

FIG. 8 is an exemplary diagram illustrating an internal configuration of a generator applied to a display apparatus with touch electrode embedded therein according to one embodiment of the present disclosure, and FIG. 9 is an exemplary diagram illustrating a lower gate clock generated by the generator illustrated in FIG. 8 according to one embodiment of the present disclosure.

Hereinabove, as described above with reference to FIGS. 1 to 6, a generator 500 (e.g., a circuit) may generate a lower gate clock CLKb corresponding to a lower gate pulse output to a lower gate line provided in the lower end of the touch group TG and normal gate clocks CLK corresponding to a normal gate pulse supplied to normal gate lines except the lower gate line among gate lines corresponding to the touch group TG.

Particularly, as illustrated in FIG. 9, the generator 500 may perform a function of increasing a falling period F of the lower gate clock CLKb than a falling period E of each of the normal gate clocks CLK. Thus, the duration of time of the falling period F of the lower gate clock CLKb is increased relative to the falling period E of the normal gate clock CLK such that the falling period F of the lower gate clock CLKb is longer than the falling time E of the normal gate clock CLK.

Before describing a structure and a function of the generator, a falling period will be described with reference to FIG. 9.

In the present disclosure, as illustrated in signal (c) of FIG. 9, each of the lower gate clock CLKb and the normal gate clocks CLK may be a pulse which has a minimum level Vmin (e.g., a first level), a maximum level Vmax (e.g., a second level greater than the first level), and a falling level Vf (e.g., a third level less than the second level and greater than the first level).

Each of the lower gate clock CLKb and the normal gate clocks CLK may rise from the minimum level Vmin to the maximum level Vmax and may fall from the maximum level to the falling level Vf based on a control clock, and then, may finally fall to the minimum level Vmin.

In the following description, a falling period may denote a period where the maximum level Vmax falls to the falling level Vf.

The reason that the lower gate clock CLKb and the normal gate clocks CLK have the falling level Vf is for preventing a normal gate pulse corresponding to the normal gate clock CLK and a lower gate pulse corresponding to the lower gate clock CLKb from rapidly falling from the maximum value to the minimum value. That is, when the normal gate pulse and the lower gate pulse fall from a maximum value to a minimum value rapidly, the other metal electrodes and metal lines of the display panel may be affected by a kickback phenomenon. In order to solve such a problem, the normal gate pulse and the lower gate pulse may fall to the minimum value via the falling value from the maximum value.

The maximum level Vmax, the falling level Vf, and the minimum level Vmin of each of the lower gate clock CLKb and the normal gate clock CLK may correspond to a maximum value, a falling value, and a minimum value of each of a normal gate pulse and a lower gate pulse.

In the present disclosure, in order to increase a duration of the falling period F of the lower gate clock CLKb relative to a duration of the falling period E of each of the normal gate clocks CLK, the generator may generate a lower falling control clock MCLKb which is greater in width than a falling control clock MCLK for controlling the falling period E of each of the normal gate clocks CLK.

For example, as illustrated in signal (b) in FIG. 9, a width of the lower falling control clock MCLKb may be set to be greater than that of the falling control clock MCLK. That is, the pulse width of the lower falling control clock MCLKb is wider than a pulse width of the falling control clock MCLK.

The lower gate clock CLKb may start to fall from a timing at which the lower falling control clock MCLKb rises and may fall (e.g., decrease) up to a timing at which the lower falling control clock MCLKb falls to a predetermined level, and thus, may reach the falling level Vf.

Therefore, the falling period F of the lower gate clock CLKb may be determined based on a width of the lower falling control clock MCLKb.

In this case, an interval CLKb between the lower gate clock and the normal gate clock CLK generated immediately before the lower gate clock CLKb among the normal gate clocks may be equal to an interval between the normal gate clocks CLK.

That is, in the embodiment described above, because the falling period F of the lower gate clock CLKb increases and a timing at which the lower gate clock CLKb is generated is not changed, the interval CLKb between the normal gate clock CLK and the lower gate clock may be equal to the interval between the normal gate clocks CLK.

However, in another embodiment of the present disclosure, an interval between the lower gate clock CLKb and the normal gate clock generated immediately before the lower gate clock among the normal gate clocks CLK may be less than the interval between the normal gate clocks CLK.

For example, in signal (c) of FIG. 9, an example is illustrated where the falling period F of the lower gate clock CLKb is greater than the falling period E of the normal gate clock CLK and an interval between the lower gate clock CLKb and the normal gate clock CLK generated immediately before the lower gate clock CLKb is less than the interval between the normal gate clocks CLK.

To this end, the generator 500 may generate a lower rising control clock GCLKb which is greater in width than a rising control clock GCLK for controlling a rising timing of one normal gate clock CLK. In this case, as illustrated in signal (a) of FIG. 9 and signal (c), the lower gate clock CLKb may rise at a timing at which the lower rising control clock GCLKb rises.

That is, the generator 500 may perform control so that a rising timing of the lower rising control clock GCLKb is earlier than a rising timing of each of the rising control clocks GCLK generated immediately before the lower rising control clock GCLKb, and thus, a timing at which the lower rising control clock GCLKb rises may be earlier, whereby the interval between the lower gate clock CLKb and the normal gate clock CLK generated immediately before the lower gate clock CLKb may be less than the interval between the normal gate clocks CLK.

In this case, a falling timing of the lower rising control clock GCLKb may be the same as a falling timing of each of the rising control clocks GCLK. That is, a width of the lower rising control clock GCLKb may increase by the earlier of a rising timing of the lower rising control clock GCLKb.

In order to perform a function described above, as illustrated in FIG. 8, the generator 500 may include a control clock generator 510 for generating a lower falling control clock MCLKb which is greater in width than a falling control clock MCLK transferred from the controller 400 and a level shifter 520 which longer increase the falling period F of the lower gate clock CLKb than the falling period E of each of the normal gate clocks CLK by using the lower falling control clock MCLKb.

First, the control clock generator 510 may generate the lower falling control clock MCLKb by using the falling control clock MCLK transferred from the controller 400 and may transfer the lower falling control clock MCLKb to the level shifter 520 at a timing at which the lower gate clock CLKb is generated. The falling control clock MCLK may be included in a gate control signal GCS.

For example, the control clock generator 510 may delay the falling control clock MCLK transferred from the controller 400 by using a resistor or a capacitor, and thus, may generate the lower falling control clock MCLKb having a width which is greater than that of the falling control clock MCLK. Also, by using other methods in addition to a method described above, the control clock generator 510 may generate the lower falling control clock MCLKb having a width which is greater than that of the falling control clock MCLK.

The control clock generator 510 may generate the lower rising control clock GCLKb by using the rising control clock GCLK transferred from the controller 400 and may transfer the lower rising control clock GCLKb to the level shifter 520 at a timing at which the lower gate clock CLKb is generated.

For example, the control clock generator 510 may quicken a rising timing of the rising control clock GCLK transferred from the controller 400 and may delay the risen signal by using a resistor or a capacitor, and thus, may generate the lower rising control clock GCLKb which rises at an earlier timing than the rising control clock GCLK. Also, by using other methods in addition to a method described above, the control clock generator 510 may generate the lower rising control clock GCLKb which rises at an earlier timing than the rising control clock GCLK.

Second, the level shifter 520 may generate the lower gate clock CLKb by using gate control signals GCS transferred from the controller 400 and the lower falling control clock MCLKb transferred from the generator 510 and may transfer the generated lower gate clock CLKb to the gate driver 200. In this case, the gate control signals GCS transferred from the controller 400 may be directly used to generate the lower gate clock CLKb, or may be transferred to the gate driver 200 through the level shifter 520. For example, the gate control signals GCS transferred from the controller 400 may include signals which are directly or indirectly used to generate the lower gate clock CLKb, or may include signals which are transferred to the gate driver 200 via the level shifter 520.

Moreover, in a case where the level shifter 520 generates the lower gate clock CLKb, as described above, the level shifter 520 may further use the lower rising control clock GCLKb transferred from the generator 510.

Moreover, the level shifter 520 may generate the normal gate clock CLK by using the gate control signals GCS transferred from the controller 400 and may transfer the generated normal gate clock CLK to the gate driver 200. The gate control signals GCS transferred from the controller 400 may include the rising control clock GCLK and the falling control clock MCLK.

That is, the level shifter 520 may generate the normal gate clock CLK by using the rising control clock GCLK and the falling control clock MCLK transferred from the controller 400.

In order to generate the normal gate clock CLK and the lower gate clock CLKb, the level shifter 520 may be supplied with powers having various levels from a power supply 700. For example, the power supply 700 may supply the level shifter 520 with voltages corresponding to the minimum level Vmin, the maximum level Vmax, and the falling level Vf, and the level shifter 520 may generate the normal gate clock CLK and the lower gate clock CLKb by using the voltages.

The power supply 700 may be implemented as one body with the level shifter 520, or as illustrated in FIG. 8, may be implemented as an element which is independently apart from the level shifter 520.

To provide an additional description, the level shifter 520 may be supplied with a voltage corresponding to the maximum level Vmax at a timing at which the rising control clock GCLK rises, supplied with a voltage corresponding to the falling level Vf until the falling control clock MCLK falls after rising, and supplied with a voltage corresponding to the minimum level Vmin from after the falling control clock MCLK falls, thereby generating the normal gate clock CLK.

Moreover, the level shifter 520 may be supplied with a voltage corresponding to the maximum level Vmax at a timing at which the rising control clock GCLK or the lower rising control clock GCLKb rises, supplied with a voltage corresponding to the falling level Vf until the lower falling control clock MCLKb falls after rising, and supplied with a voltage corresponding to the minimum level Vmin from after the lower falling control clock MCLKb falls, thereby generating the lower gate clock CLKb.

As described above, the falling period of the lower gate clock CLKb may be greater than the falling period E of the normal gate clock CLK, and thus, a falling period of a lower gate pulse supplied to a lower gate line may be longer than a falling period of a normal gate pulse supplied to a normal gate line since the lower gate pulse is generated based on the lower gate clock CLKb. That is, a gate signal having a pulse that is generated based on the lower gate clock CLKb has a form that is different from a gate signal having a pulse generated based on the normal gate clock CLK. For example, the pulse of the gate signal generated based on the lower gate clock CLKb may have a width that is wider than a width of the pulse of the gate signal generated based on the normal gate clock CLK. Furthermore, a duration of time for the pulse of the gate signal generated based on the lower gate clock CLKb to decrease from the maximum level to the falling level Vf is longer than a duration of time for the pulse of the gate signal generated based on the normal gate clock CLK to decrease from the maximum level to the falling level Vf.

When a falling period of a lower gate pulse increases, a period where a data voltage transferred through a data line is supplied to a pixel through a switching transistor Tsw1 may increase.

For example, in a case where the pixel illustrated in FIG. 2 is a pixel connected to a lower gate line (hereinafter simply referred to as a lower pixel), when a falling period of a lower gate pulse increases, a period where a switching transistor Tsw1 of a lower pixel is turned on may increase. When a period where the switching transistor Tsw1 is turned on increases, a period where a data voltage is supplied to a pixel electrode through the switching transistor Tsw1 may increase. When a period where the data voltage is supplied to the pixel electrode increases, a period where the pixel electrode is charged with the data voltage may increase, and thus, the data voltage may be charged into the pixel electrode.

Therefore, as described above, despite that a real common voltage VCOMd applied to a touch electrode when an image is displayed as a lower gate pulse is supplied is less than a real common voltage VCOMd applied to the touch electrode when normal gate pulses are supplied, the luminance of pixels connected to the lower gate line may not be greatly reduced, and luminance corresponding to original data voltages may be output.

That is, in the present disclosure, a period where a data voltage is supplied to a pixel may increase for compensating for a reduction in a real common voltage VCOMd supplied to lower pixels. When a data voltage is sufficiently charged into a pixel, despite a reduction in real common voltage VCOMd, the luminance of a lower pixel may not be reduced and may be maintained at a level corresponding to the data voltage.

When a pulse width of the lower gate clock CLKb increases more than a pulse width of the normal gate clock CLK based on the lower rising control clock GCLKb, an effect thereof may increase.

Figure 10:
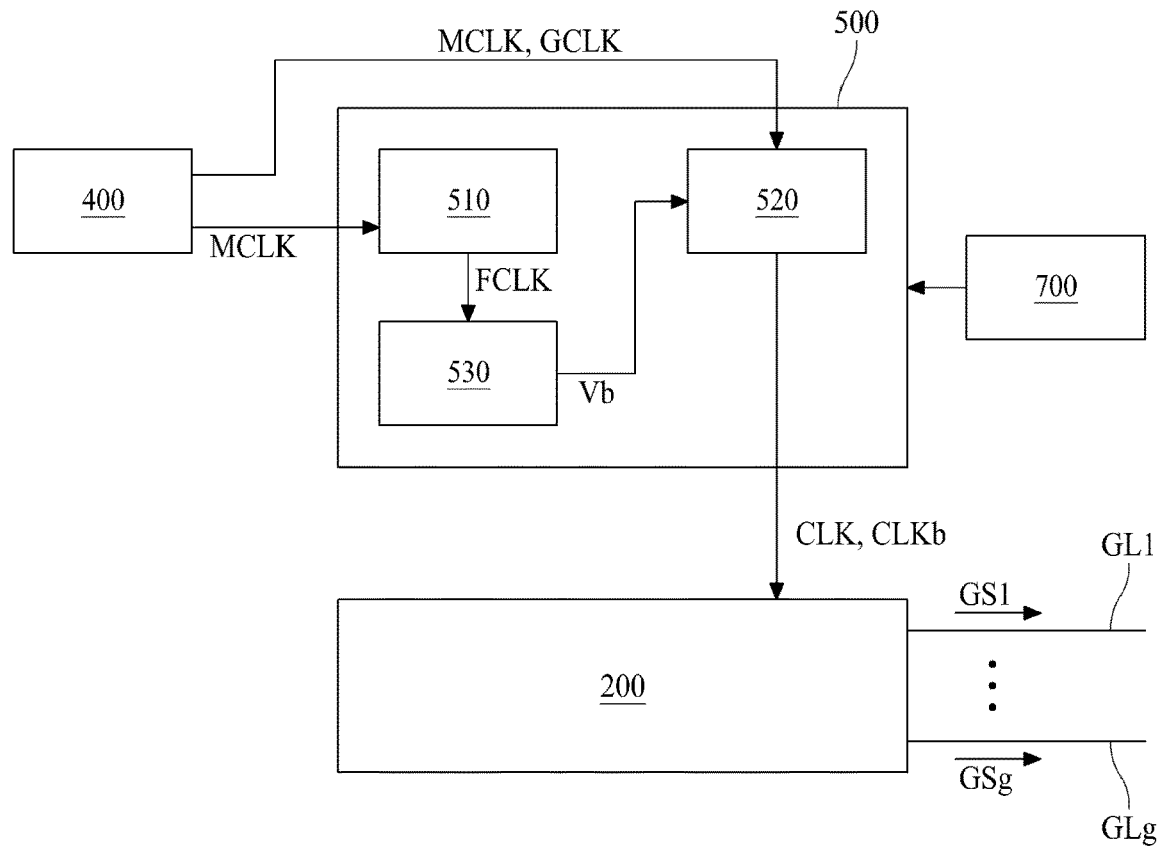
FIG. 10 is another exemplary diagram illustrating an internal configuration of a generator applied to a display apparatus with a touch electrode embedded therein according to one embodiment of the present disclosure.
Figure 11:
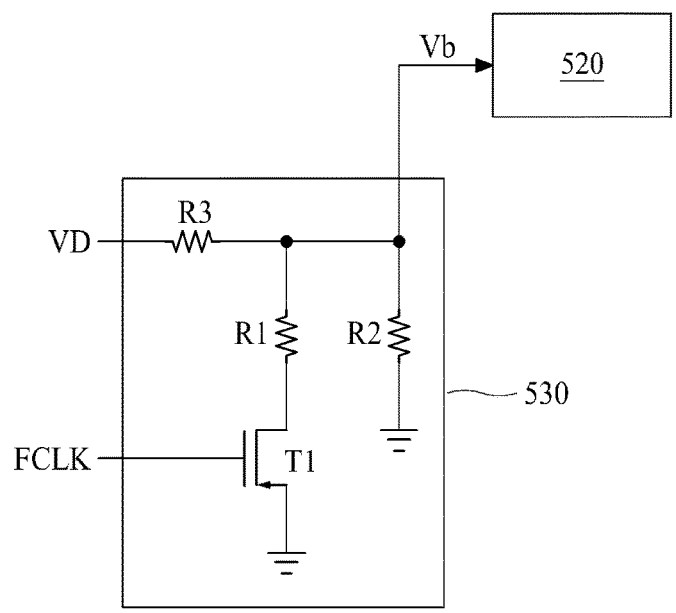
FIG. 11 is an exemplary diagram illustrating a configuration of a lower voltage generator illustrated in FIG. 10 according to one embodiment of the present disclosure.
Figure 12:
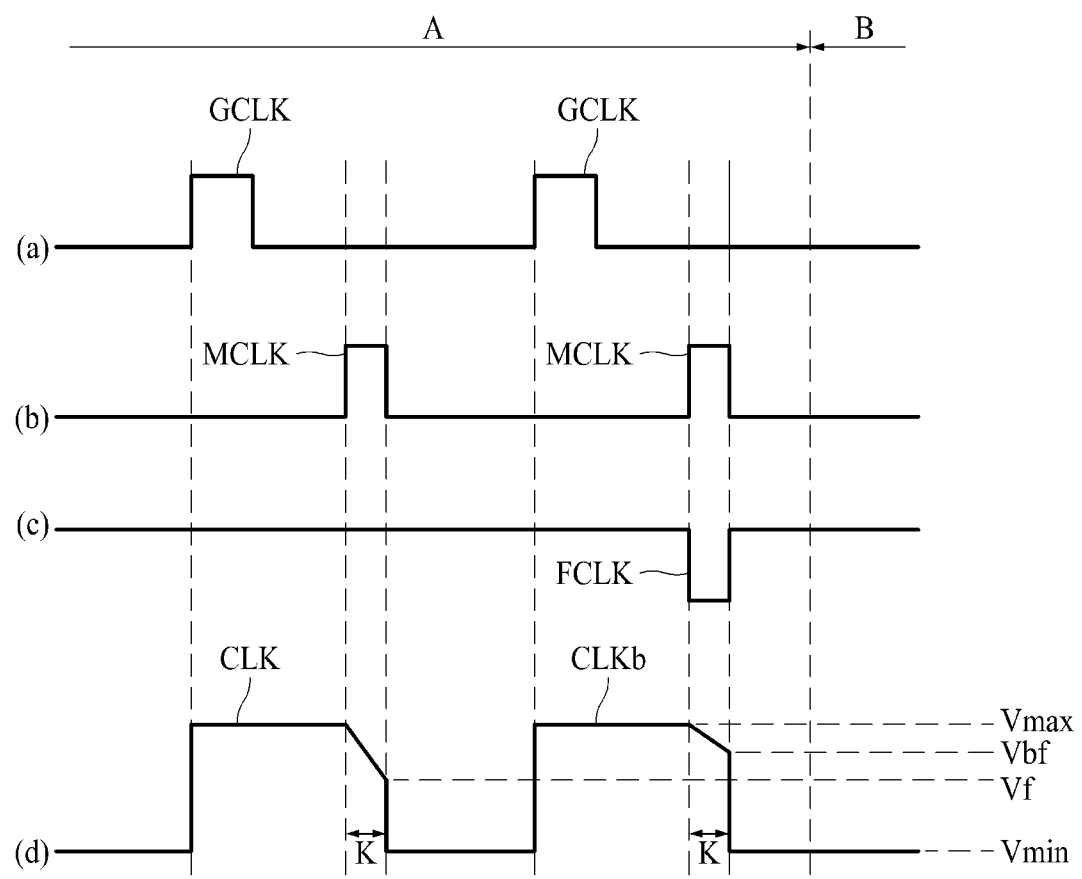
FIG. 12 is an exemplary diagram illustrating a lower gate clock generated by the generator illustrated in FIG. 10 according to one embodiment of the present disclosure.

FIG. 10 is another exemplary diagram illustrating an internal configuration of a generator applied to a display apparatus with a touch electrode embedded therein according to one embodiment of the present disclosure. FIG. 11 is an exemplary diagram illustrating a configuration of a lower voltage generator illustrated in FIG. 10 according to one embodiment of the present disclosure. FIG. 12 is an exemplary diagram illustrating a lower gate clock generated by the generator illustrated in FIG. 10 according to one embodiment of the present disclosure. FIG. 13 is an exemplary diagram for describing an effect of the present disclosure based on the generator illustrated in FIG. 10 according to one embodiment of the present disclosure. In the following description, details which are the same as or similar to details described above with reference to FIGS. 1 to 9 are omitted or will be briefly described.

Hereinabove, as described above with reference to FIGS. 1 to 6, a generator 500 may generate a lower gate clock CLKb corresponding to a lower gate pulse output to a lower gate line provided in the lower end of a touch group TG and normal gate clocks CLK corresponding to a normal gate pulse supplied to normal gate lines except the lower gate line among gate lines corresponding to the touch group TG.

Particularly, as illustrated in FIG. 12, the generator 500 may perform a function of varying a falling level (hereinafter simply referred to as a lower falling level) Vbf of the lower gate clock CLKb than a falling level (hereinafter simply referred to as a falling level) Vf of the normal gate clock CLK.

Before describing a structure and a function of the generator, a falling level will be described with reference to FIG. 12.

In the present disclosure, as illustrated in signal (d) of FIG. 12, the normal gate clock CLK may be a pulse which has a minimum level Vmin (e.g., a first level), a maximum level Vmax (e.g., a second level greater than the first level), and a falling level Vf (e.g., a third level greater than the first level and less than the second level), and as illustrated in signal (d) of FIG. 12, the lower gate clock CLKb may be a pulse which has the minimum level Vmin, the maximum level Vmax, and a lower falling level Vbf (e.g., a fourth level greater than the first level and the third level and less than the second level).

The normal gate clock CLK may rise from the minimum level Vmin to the maximum level Vmax and may fall from the maximum level to the falling level Vf based on a control clock, and then, may finally fall to the minimum level Vmin. The lower gate clock CLKb may rise from the minimum level Vmin to the maximum level Vmax and may fall from the maximum level to the lower falling level Vbf based on the control clock, and then, may finally fall to the minimum level Vmin.

In the following description, a falling period may denote a period where the maximum level Vmax falls to the falling level Vf, or may denote a period where the maximum level Vmax falls to the lower falling level Vbf.

The reason that the normal gate clock CLK has the falling level Vf and the lower gate clock CLKb has the falling level Vbf is for preventing a normal gate pulse corresponding to the normal gate clock CLK and a lower gate pulse corresponding to the lower gate clock CLKb from rapidly falling from the maximum value to the minimum value. That is, when the normal gate pulse and the lower gate pulse fall from a maximum value to a minimum value rapidly, the other metal electrodes and metal lines of the display panel may be affected by a kickback phenomenon. In order to solve such a problem, the normal gate pulse may fall to the minimum value via the falling value from the maximum value, and the lower gate pulse may fall to the minimum value via the lower falling value from the maximum value.

The maximum level Vmax, the falling level Vf, and the minimum level Vmin of the normal gate clock CLK may correspond to a maximum value, a falling value, and a minimum value of a normal gate pulse. The maximum level Vmax, the lower falling level Vbf, and the minimum level Vmin of the lower gate clock CLKb may correspond to a maximum value, a lower falling value, and a minimum value of a lower gate pulse.

In the present disclosure, by using a falling control clock MCLK for controlling a falling period of the lower gate clock CLKb, the generator 500 may generate a falling level control clock FCLK for shifting a level to which the lower gate clock CLKb falls, so that the lower falling level Vbf to which the lower gate clock CLKb falls is higher than the falling level Vf to which the normal gate clock CLK falls.

For example, as illustrated in signal (c) of FIG. 12, the falling level control clock FCLK may have the same width as that of the falling control clock MCLK and may have a phase which is opposite to that of the falling control clock MCLK. That is, a width, a rising timing, and a falling timing of the falling level control clock FCLK may be the same as a width, a rising timing, and a falling timing of the falling control clock MCLK, and a phase of the falling level control clock FCLK may be opposite to that of the falling control clock MCLK.

Therefore, the falling level control clock FCLK may be generated by inverting the falling control clock MCLK.

The generator may shift a falling level (i.e., the lower falling level Vbf) of the lower gate clock CLKb by using the falling level control clock FCLK.

The lower gate clock CLKb may start to fall from a timing at which the falling control clock MCLK rises and may fall up to a timing at which the falling control clock falls, and thus, may reach the lower falling level. In this case, the lower falling level Vbf of the lower gate clock CLKb may be generated by the falling level control clock FCLK which is generated at the same timing as the falling control clock MCLK.

The lower falling level Vbf may be set to have a value which is greater than the falling level Vf of the normal gate clock CLK.

In this case, as illustrated in signal (d) of FIG. 12, a duration of falling period K where the lower gate clock CLKb falls from the maximum level Vmax to the lower falling level Vbf may be the same as a duration of the falling period K where the normal gate clock CLK falls from the maximum level Vmax to the falling level Vf.

That is, a width of the falling control clock MCLK used to generate the lower gate clock CLKb may be the same as that of the falling control clock MCLK used to generate the normal gate clock CLK, and thus, a falling period K of the lower gate clock may be the same as a falling period K of the normal gate clock.

Moreover, because a rising timing, a falling timing, and a width of the rising control clock GCLK used to generate the lower gate clock CLKb are the same as a rising timing, a falling timing, and a width of the rising control clock GCLK used to generate the normal gate clock CLK, an interval CLKb between the lower gate clock and the normal gate clock CLK generated immediately before the lower gate clock CLKb among the normal gate clocks may be equal to an interval between the normal gate clocks CLK.

That is, in the embodiment described above with reference to FIG. 9, because a width of the lower falling control clock MCLKb differs from that of the falling control clock MCLK, a falling period F of the lower gate clock CLKb may differ from a falling period E of the normal gate clock CLK.

However, in the embodiment described above with reference to FIG. 12, because the same falling control clocks MCLK are used to generate the lower gate clock CLKb and the normal gate clock CLK, a falling period of the lower gate clock may be the same as a falling period of the normal gate clock.

Moreover, in the embodiment described above with reference to FIG. 9, because rising timings of the lower rising control clock GCLKb and the rising control clock GCLK for controlling timings at which the lower gate clock CLKb and the normal gate clock CLK are generated differ, an interval between the lower gate clock CLKb and the normal gate clock CLK generated immediately before the lower gate clock CLKb among the normal gate clocks CLK may be less than an interval between the normal gate clocks CLK.

However, in the embodiment described above with reference to FIG. 12, because the same falling control clocks MCLK are used to generate the lower gate clock CLKb and the normal gate clock CLK, an interval between the lower gate clock CLKb and the normal gate clock CLK generated immediately before the lower gate clock CLKb among the normal gate clocks CLK may be the same as the interval between the normal gate clocks CLK. Also, based on such reasons, a width K of each of the normal gate clocks CLK may be the same as a width K of the lower gate clock CLKb.

As described above, the generator 500 may increase a voltage from the minimum level Vmin to the maximum level Vmax, and then, may decrease a voltage to the falling level Vf which is less than the maximum level Vmax and is greater than the minimum level Vmin, based on the falling control clock MCLK, thereby generating the normal gate clock CLK. Also, the generator 500 may generate the normal gate clock, increase a voltage from the minimum level Vmin to the maximum level Vmax, and decrease a voltage to the lower falling level Vbf which is less than the maximum level Vmax and is greater than the falling level Vf, based on the falling control clock MCLK, thereby generating the lower gate clock CLKb.

In this case, the generator 500 may generate a lower voltage Vb corresponding to the lower falling level Vbf based on the falling level control clock FCLK generated simultaneously with the falling control clock MCLK.

In order to perform a function described above, as illustrated in FIG. 10, the generator 500 (e.g., a circuit) may include a control clock generator 510 (e.g., a circuit) for generating the falling level control clock FCLK having the same width and timing as those of the falling control clock MCLK transferred from the controller 400, a lower voltage generator 530 (e.g., a circuit) which generates the lower voltage Vb corresponding to the lower falling level Vbf by using the falling level control clock FCLK, and a level shifter 520 (e.g., a circuit) which increases a falling level (i.e., the lower falling level Vbf) of the lower gate clock CLKb relative to a falling level (i.e., the falling level Vf) of each of the normal gate clocks CLK by using the lower voltage Vb.

First, the control clock generator 510 may generate the falling level control clock FCLK by using the falling control clock MCLK transferred from the controller 400 and may transfer the falling level control clock FCLK to the level shifter 520 at a timing at which the lower gate clock CLKb is generated.

For example, the control clock generator 510 may shift a phase of the falling control clock MCLK transferred from the controller 400 to generate a falling level control clock FCLKb. A method of shifting a phase of the falling control clock MCLK may be one of various methods which are currently used to shift a phase of a clock.

Hereinabove, an example where a phase of the falling level control clock FCLKb is opposite to that of the falling control clock MCLK has been described above, but in the present disclosure, a phase of the falling level control clock FCLKb may be formed in the same shape as that of a phase of the falling control clock MCLK or may be formed to have a width which differs from that of the falling control clock MCLK, and in addition, may be formed in various shapes. Also, the falling level control clock FCLKb may be formed by using clocks other than the falling control clock MCLK.

Second, the lower voltage generator 530 may generate the lower voltage Vb corresponding to the lower falling level Vbf by using the falling level control clock FCLK. To this end, as illustrated in FIG. 11, the lower voltage generator 530 may include a first transistor T1 which includes a first terminal connected to a first resistor R1, a second terminal connected to a ground, and a gate receiving the falling level control clock FCLK, the first resistor R1 which includes a first terminal connected to the second resistor R2 and a second terminal connected to the first transistor T1, the second resistor R2 which includes a first terminal connected to the first resistor R1 and a second terminal connected to the ground, and a third resistor R3 which includes a first terminal supplied with a driving voltage VD and a second terminal connected to the first resistor R1 and the second resistor R2, and the first terminal of the first resistor, the first terminal of the second resistor, and the second terminal of the third resistor may be connected to the level shifter 520.

In this case, the driving voltage VD may be supplied from the power supply 700.

For example, in a period where the normal gate clocks CLK are generated, the falling level control clock FCLK may not be supplied to the gate of the first transistor T1. Accordingly, the first transistor T1 is turned on.

In this case, a resistance of the lower voltage generator 530 may be determined based on the first resistor R1, the second resistor R2, and the third resistor R3. Accordingly, the driving voltage VD may be shifted to a voltage corresponding to the falling level Vf by the first resistor R1, the second resistor R2, and the third resistor R3, and a voltage corresponding to the falling level Vf may be transferred to the level shifter 520.

The level shifter 520 may generate the normal gate clock CLK by using a voltage corresponding to the falling level Vf.

At a timing at which the lower gate clock CLKb is generated, when the falling level control clock FCLK generated by the control clock generator 510 is transferred to the gate of the first transistor T1, the first transistor T1 may be turned off.

In this case, a resistance of the lower voltage generator 530 may be determined based on the second resistor R2 and the third resistor R3 but not the first resistor R1. Accordingly, the driving voltage VD may be shifted to a voltage (hereinafter simply referred to as a lower voltage) Vb corresponding to the lower falling level Vbf by the second resistor R2 and the third resistor R3, and the lower voltage Vb corresponding to the lower falling level Vbf may be transferred to the level shifter 520.

The level shifter 520 may generate the lower gate clock CLKb by using the lower voltage Vb corresponding to the lower falling level Vbf.

That is, the lower voltage generator 530 may vary an internal resistance of the lower voltage generator 530 to generate the lower voltage Vb, based on the falling level control clock FCLK.

In the description, an example where the lower falling level Vbf is higher than the falling level Vf has been described, but in the present disclosure, the lower falling level Vbf may be set to be lower than the falling level Vf. That is, based on a characteristic of the display panel, the lower falling level Vbf may be set to be higher or lower than the falling level Vf.

In the embodiment shown in FIG. 12, a gate signal having a pulse that is generated based on the lower gate clock CLKb has a form that is different from a gate signal having a pulse generated based on the normal gate clock CLK. For example, the pulse of the gate signal generated based on the lower gate clock CLKb may have a width that that is the same as a width of the pulse of the gate signal generated based on the normal gate clock CLK. Furthermore, a duration of time for the pulse of the gate signal generated based on the lower gate clock CLKb to decrease from the maximum level to the lower falling level Vbf is the same as a duration of time for the pulse of the gate signal generated based on the normal gate clock CLK to decrease from the maximum level to the falling level Vf.

To provide an additional description, a phenomenon where a horizontal stripe is shown in a lowermost end of each touch group may occur because a real common voltage VCOMd of when a gate pulse is supplied to a lower gate line (for example, an $n^{th}$ gate line) of a touch group TG is less than a real common voltage VCOMd of when gate pulses are supplied to normal gate lines (for example, an n–$1^{th}$ gate line) provided in the upper end of the touch group TG.

In order to compensate for such a difference, in the present disclosure, when it is determined that the $n^{th}$ gate line is darker than the n–$1^{th}$ gate line, the lower falling level Vbf may increase, and thus, the $n^{th}$ gate line may be brighter.

Moreover, in the present disclosure, when it is determined that the $n^{th}$ gate line is brighter than the n–$1^{th}$ gate line, the lower falling level Vbf may decrease, and thus, the $n^{th}$ gate line may be darker.

That is, in the present disclosure, a phenomenon where a horizontal stripe is shown may be prevented by decreasing a luminance difference between the lower gate line of the touch group TG and the normal gate lines provided in the upper end thereof.

In this case, a difference voltage between the lower falling level Vbf and the falling level Vf may variously vary based on a magnitude of each of the minimum level Vmin, the maximum level Vmax, and the falling level Vf, and for example, may be one of 3 V and 4 V.

Third, the level shifter 520 may generate the lower gate clock CLKb by using the gate control signals transferred from the controller 400 and the lower voltage Vb transferred from the lower voltage generator 530 and may transfer the lower gate clock CLKb to the gate driver 200.

In this case, the gate control signals GCS transferred from the controller 400 may be directly used to generate the lower gate clock CLKb, or may be transferred to the gate driver 200 through the level shifter 520. For example, the gate control signals GCS transferred from the controller 400 may include signals which are directly or indirectly used to generate the lower gate clock CLKb, or may include signals which are transferred to the gate driver 200 via the level shifter 520.

Moreover, the level shifter 520 may generate the normal gate clock CLK by using gate control signals GCS transferred from the controller 400 and may transfer the generated normal gate clock CLK to the gate driver 200.

That is, the level shifter 520 may generate the normal gate clock CLK by using the rising control clock GCLK and the falling control clock MCLK transferred from the controller 400.

In order to generate the normal gate clock CLK and the lower gate clock CLKb, the level shifter 520 may be supplied with powers having various levels from the power supply 700. For example, the power supply 700 may supply the level shifter 520 with voltages corresponding to the minimum level Vmin, the maximum level Vmax, and the falling level Vf, and the level shifter 520 may generate the normal gate clock CLK and the lower gate clock CLKb by using the voltages.

The power supply 700 may be implemented as one body with the level shifter 520, or as illustrated in FIG. 8, may be implemented as an element which is independently apart from the level shifter 520.

To provide an additional description, the level shifter 520 may be supplied with a voltage corresponding to the maximum level Vmax at a timing at which the rising control clock GCLK rises, supplied with a voltage corresponding to the falling level Vf until the falling control clock MCLK falls after rising, and supplied with a voltage corresponding to the minimum level Vmin from after the falling control clock MCLK falls, thereby generating the normal gate clock CLK.

Moreover, the level shifter 520 may be supplied with a voltage corresponding to the maximum level Vmax at a timing at which the rising control clock GCLK rises, supplied with a voltage corresponding to the falling level Vf until the falling control clock MCLK falls after rising, and supplied with a voltage corresponding to the minimum level Vmin from after the falling control clock MCLK falls, thereby generating the lower gate clock CLKb. The falling level control clock FCLK may rise and fall at the same timing as the falling control clock MCLK.

As described above, the present disclosure may perform control so that the lower falling level Vbf is higher or lower than the falling level Vf, thereby preventing a horizontal stripe defect.

Hereinafter, an effect of the present disclosure obtained when the lower falling level Vbf is higher or lower than the falling level Vf will be described as an example of the present disclosure.

That is, according to the present disclosure described above, the lower falling level Vbf of the lower gate clock CLKb may be higher than the falling level Vf of the normal gate clock CLK. Accordingly, a lower falling voltage of a lower gate pulse supplied to a lower gate line may be higher than a falling voltage of a normal gate pulse supplied to a normal gate line.

The lower falling voltage being higher than the falling voltage may denote that the lower gate pulse falls slower compared to the normal gate pulse. This may denote that the amount of decrease in real common voltage VCOMd caused by the lower gate pulse is less than the amount of decrease in real common voltage VCOMd caused by the lower gate pulse in the display apparatus of the related art.

Figure 13A:
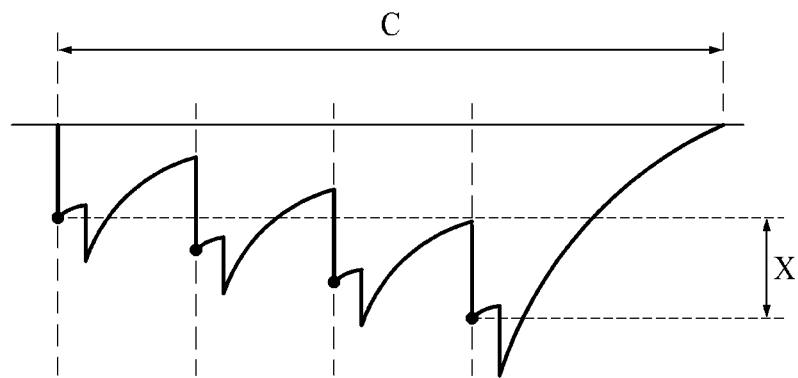
FIGS. 13A and 13B are exemplary diagrams for describing an effect of the present disclosure based on the generator illustrated in FIG. 10.

For example, FIG. 13A illustrates a real common voltage VCOMd of the end portion C of one display period in the related art display apparatus with touch electrode embedded therein. In this case, a difference (hereinafter referred to as a common voltage difference of the related art) between a real common voltage VCOMd supplied to a normal gate line and a real common voltage VCOMd supplied to a lower gate line when the end portion C starts is illustrated by X.

Figure 13B:
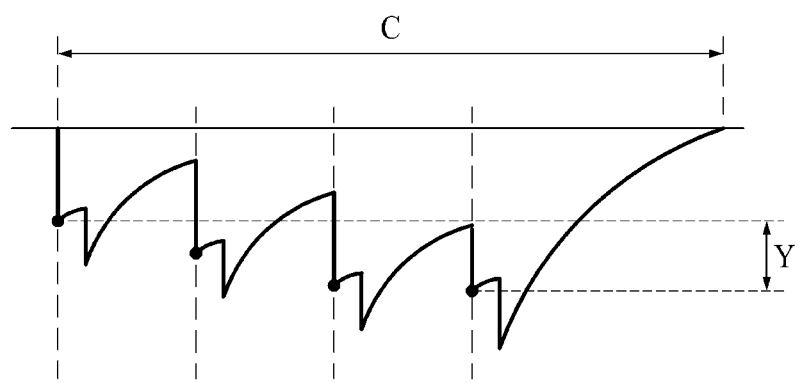

For example, FIG. 13B illustrates a real common voltage VCOMd of the end portion C of one display period in the display apparatus with touch electrode embedded therein according to one embodiment of the present disclosure. In this case, a difference (hereinafter referred to as a common voltage difference of the present disclosure) between a real common voltage VCOMd supplied to a normal gate line and a real common voltage VCOMd supplied to a lower gate line when the end portion C starts is illustrated by Y.

In this case, the common voltage difference Y of the present disclosure may be less than the common voltage difference of the related art. According to the present disclosure, this may denote that the amount of decrease in real common voltage VCOMd is reduced.

To provide an additional description, in the display apparatus of the related art, a lower gate pulse may rapidly fall to a falling voltage corresponding to the falling level Vf, and the amount of decrease in real common voltage VCOMd may increase due to the rapidly-falling lower gate pulse. That is, the rapidly-falling lower gate pulse may affect a touch electrode, and thus, a real common voltage may rapidly decrease. In this case, because the real common voltage VCOMd is lower than a normal common voltage, the luminance of a pixel connected to the lower gate line may be less than luminance based on a real data voltage.

However, in the present disclosure, the lower gate pulse may gently fall to the lower falling voltage corresponding to the lower falling level Vbf, and the amount of decrease in real common voltage VCOMd is reduced by the gently-falling lower gate pulse. That is, an influence of the gently-falling lower gate pulse on the touch electrode may be reduced compared to an influence of the related art display apparatus thereon. Accordingly, the luminance of a pixel connected to the lower gate line may be luminance corresponding to a real data voltage.

That is, in the present disclosure, in order to compensate for a reduction in real common voltage VCOMd supplied to lower pixels, the lower falling level Vbf of the lower gate clock CLKb may be set to be higher than the falling level Vf of the normal gate clock. In a case where the lower falling level Vbf of the lower gate clock CLKb is set to be higher than the falling level Vf of the normal gate clock, the amount of decrease in real common voltage VCOMd may be reduced when an image is displayed in the lower gate line. Accordingly, the luminance of a lower pixel may not be reduced and may be maintained at a level corresponding to a data voltage.

The generator 500, as illustrated in FIGS. 8 and 10, may be configured independently of the controller 400, or may be included in the controller 400.

Moreover, in the above description, a lower gate line may be defined as a gate line provided in a lower end of a touch group corresponding thereto, but the present disclosure is not limited thereto. That is, the lower gate line may be a gate line provided in a lower end among gate lines corresponding to the touch group, and moreover, may be a gate line where a horizontal stripe defect occurs.

To provide an additional description, regardless of a position of a touch group, a gate line where the horizontal stripe defect caused by a variation of a real common voltage VCOMd occurs may be the lower gate line described above, and the present disclosure described above may be applied to a lower gate line where a horizontal stripe defect occurs.

According to the present disclosure, a defect may be prevented where horizontal stripes caused by a luminance difference appear in specific regions of a display panel with touch electrodes embedded therein.

Particularly, according to the present disclosure, when touch electrodes are divided into touch groups and a display period and a touch sensing period are repeated during one frame period, a horizontal stripe defect may be prevented from occurring in a lower end of each touch group.

Accordingly, according to the present disclosure, a production yield rate of display apparatuses may be enhanced, and the image quality of display apparatuses may be enhanced.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
  a display panel including a plurality of gate lines and a plurality of touch groups including a plurality of touch electrodes;
  a generator circuit configured to generate a lower gate clock corresponding to a lower gate pulse that is output to a lower gate line among gate lines corresponding to a touch group from the plurality of touch groups, and generate normal gate clocks corresponding to normal gate pulses that are output to normal gate lines except the lower gate line among the gate lines corresponding to the touch group;
  a controller configured to supply gate control signals to the generator circuit; and
  a gate driver configured to generate gate pulses including the lower gate pulse and the normal gate pulses using the gate control signals, the lower gate clock, and the normal gate clocks, and supply the gate pulses to the gate lines corresponding to the touch group,
  wherein a form of the lower gate clock is different from a form of each of the normal gate clocks,
  each of the plurality of touch groups is arranged in parallel with the plurality of gate lines, and the plurality of touch groups are arranged in a direction that is perpendicular to the plurality of gate lines.

2. The display apparatus of claim 1, wherein the generator circuit is configured to generate a control clock that is used to generate the lower gate clock based on the gate control signals from the controller.

3. The display apparatus of claim 2, wherein each of the normal gate clocks and the lower gate clock is a pulse having a minimum level, a maximum level, and a falling level,
  each of the normal gate clocks and the lower gate clock increases from the minimum level to the maximum level and decreases from the maximum level to the falling level based on the control clock, and decreases from the falling level to the minimum level, and
  a period during which each of the normal gate clocks and the lower gate clock deceases from the maximum level to the falling level is a falling period of the respective normal gate clock and the lower gate clock.

4. The display apparatus of claim 3, wherein the generator circuit is configured to increase a duration of the falling period of the lower gate clock to be longer than a duration of the falling period of each of the normal gate clocks.

5. The display apparatus of claim 4, wherein the generator circuit is configured to generate a width of a lower falling control clock that controls the falling period of the lower gate clock to be wider than a width of a falling control clock that controls the falling period of each of the normal gate clocks, and the lower gate clock starts to decrease from the maximum level to the falling level responsive to a timing at which the lower falling control clock rises and continues to decrease to the falling level until a timing at which the lower falling control clock reaches a falling level.

6. The display apparatus of claim 5, wherein an interval between the lower gate clock and a normal gate clock from the normal gate clocks that is generated immediately before the lower gate clock is equal to an interval between the normal gate clocks.

7. The display apparatus of claim 5, wherein an interval between the lower gate clock and a normal gate clock from the normal gate clocks that is generated immediately before the lower gate clock is less than an interval between the normal gate clocks.

8. The display apparatus of claim 7, wherein the generator circuit is configured to generate a width of a lower rising control clock that controls a timing that the lower gate clock rises to be wider than a width of a rising control clock that controls a timing that the normal gate clock rises, and the lower gate clock rises responsive to the lower rising control clock rising.

9. The display apparatus of claim 5, wherein the generator circuit comprises:

a control clock generator circuit configured to generate the lower falling control clock having the width that is wider than the width of the falling control clock received from the controller; and a level shifter is configured to increase the falling period of the lower gate clock to be longer than the falling period of each of the normal gate clocks based on the lower falling control clock.

10. The display apparatus of claim 9, wherein the level shifter is configured to generate the lower gate clock based on the gate control signals from the controller and the lower falling control clock from the generator circuit, and transfer the generated lower gate clock to the gate driver.

11. The display apparatus of claim 1, wherein the generator circuit is configured to shift a level to which the lower gate clock decreases to from a maximum level to be greater than a level to which a normal gate clock decreases to from the maximum level.

12. The display apparatus of claim 11, wherein the generator circuit is configured to generate a falling level control clock that shifts the level to which the lower gate clock decreases to from the maximum level based on a falling control clock that controls a falling period of the lower gate clock.

13. The display apparatus of claim 12, wherein a width and a timing of the falling level control clock are equal to a width and a timing of the falling control clock.

14. The display apparatus of claim 12, wherein the generator circuit is configured to generate the normal gate clock by increasing a voltage of the normal gate clock from a minimum level to a maximum level, and decreasing the voltage from the maximum level to a falling level that is less than the maximum level and is greater than the minimum level based on the falling control clock, the generator circuit is configured to generate the lower gate clock by increasing a voltage of the lower gate clock from the minimum level to the maximum level, and decreasing the voltage to a lower falling level that is less than the maximum level and greater than the falling level of the normal gate clock based on the falling control clock, and the generator circuit is configured to generate a lower falling voltage corresponding to the lower falling level based on a falling level control clock generated simultaneously with the falling control clock.

15. The display apparatus of claim 14, wherein the generator circuit comprises:

a control clock generator circuit configured to generate the falling level control clock having a same width and timing as the falling control clock transferred from the controller;

a lower voltage generator circuit configured to generate a lower voltage corresponding to the lower falling level based on the falling level control clock; and a level shifter configured to increase the level to which the lower gate clock falls from the maximum level to be greater than the level to which each of the normal gate clocks falls from the maximum level based on the lower voltage.

16. The display apparatus of claim 15, wherein the level shifter is configured to generate the lower gate clock based on the gate control signals transferred from the controller and the lower voltage transferred from the lower voltage generator, and transfer the lower gate clock to the gate driver.

17. The display apparatus of claim 11, wherein an interval between the lower gate clock and a normal gate clock from the normal gate clocks that is generated immediately before the lower gate clock is equal to an interval between the normal gate clocks.

18. The display apparatus of claim 11, wherein a width of each of the normal gate clocks is equal to a width of the lower gate clock.

19. The display apparatus of claim 1, wherein the lower gate line is a last gate line among the gate lines corresponding to the touch group.

20. The display apparatus of claim 1, wherein an image is displayed on a first region corresponding to the touch group, and then, a touch applied to the first region is sensed using touch electrodes included in the first region, and after the touch is sensed in the first region, an image is displayed on a second region corresponding to another touch group that is adjacent to the touch group, and after the image is displayed on the second region, a touch applied to the second region is sensed using touch electrodes included in the second region.

21. A display apparatus comprising:

a display panel including a touch group having a plurality of touch electrodes, a plurality of gate lines that overlap the plurality of touch electrodes of the touch group, and a plurality of pixels that are connected to the plurality of gate lines, the plurality of gate lines including a first gate line and a second gate line that is located after the first gate line from amongst the plurality of gate lines; and a gate driver configured to output a plurality of gate signals that are supplied to the plurality of gate lines, the plurality of gate signals including a first gate signal output to the first gate line and a second gate signal output to the second gate line, wherein the first gate signal output to the first gate line includes a first gate pulse having a form that is different from a form of a second gate pulse included in the second gate signal that is output to the second gate line located after the first gate line, wherein a width of the second gate pulse is wider than a width of the first gate pulse, wherein the first gate pulse and the second gate pulse each increase from a first level to a second level that is greater than the first level, decrease from the second level to a third level that is less than the second level and greater than the first level, and decrease from the third level to the first level, and wherein a duration of time to decrease from the second level to the third level in the second gate pulse is longer than a duration of time to decrease from the second level to the third level in the first gate pulse.

22. The display apparatus of claim 21, wherein a width of the second gate pulse is a same as a width of the first gate pulse.

23. The display apparatus of claim 4, wherein the first gate pulse increases from a first level to a second level that is greater than the first level, decrease from the second level to a third level that is less than the second level and greater than the first level, and decrease from the third level to the first level, wherein the second gate pulse increases from the first level to the second level that is greater than the first level, decrease from the second level to a fourth level that is less than the second level and greater than the first level and the third level, and decrease from the fourth level to the first level.

24. The display apparatus of claim 23, wherein a duration of time to decrease from the second level to the third level in the first gate pulse is a same as a duration of time to decrease from the second level to the fourth level in the second gate pulse.

25. The display apparatus of claim 21, wherein the second gate line is a last gate line from amongst the plurality of gate lines that overlap the plurality of touch electrodes of the touch group.

* * * * *